Feb. 19, 1946.   H. M. DODGE   2,395,107
SEALING RING
Filed July 17, 1944

INVENTOR.
Howard M. Dodge
BY
Evans + McCoy
ATTORNEYS

Patented Feb. 19, 1946

2,395,107

UNITED STATES PATENT OFFICE 2,395,107

SEALING RING

Howard M. Dodge, Wabash, Ind., assignor to The General Tire & Rubber Company, Akron, Ohio, a corporation of Ohio Application July 17, 1944, Serial No. 545,247

3 Claims. (Cl. 286—11)

This invention relates to sealing rings of the type commonly employed for sealing a shaft opening of a pump housing.

The invention has for an object to provide a sealing ring in the form of an expansible rubber band engageable with a cylindrical surface to be sealed and provide with a separate rubber cushion interposed between the exansible band and an outer retaining shell.

It is also an object of the invention to provide a sealing ring with an internal sealing band formed of oil resistant rubber and a cushioning portion composed of a soft rubber disposed exteriorly of the band between the band and an outer retaining shell, to maintain a radial pressure on the band.

With the above and other objects in view, the invention may be said to comprise the sealing ring as illustrated in the accompanying drawing hereinafter described and particularly set forth in appended claims, together with such variations and modifications thereof as will be apparent to one skilled in the art to which the invention pertains.

Reference should be had to the accompanying drawing forming a part of this specification, in which.

Figure 1:
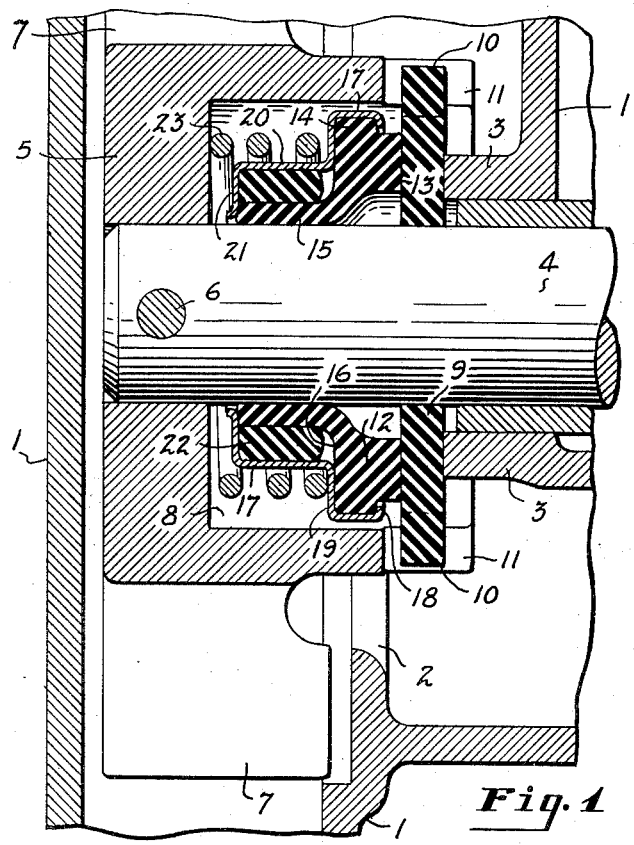
Fig. 1 is an axial section through a sealing ring embodying the invention, showing the ring mounted in the hub of a pump of the impeller type.
Figure 2:
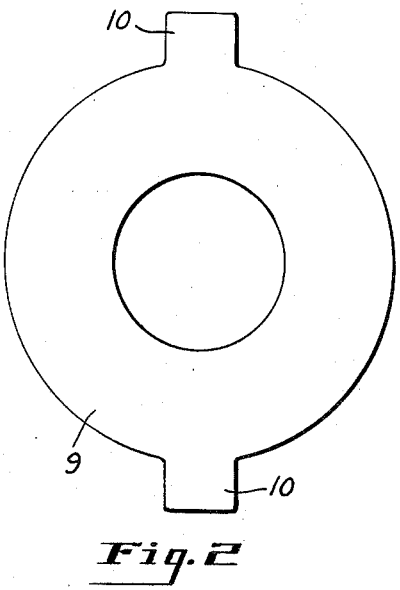
Fig. 2 is a plan view of the thrust washer against which one end of the sealing ring bears.

In the accompanying drawing the invention is shown applied to a pump of the rotary impeller type having a housing 1 provided with an axial inlet 2 and a bearing portion 3 disposed centrally of the inlet in which a shaft 4 is carried. The shaft 4 extends into the housing 1 and is attached to the impeller hub 5 by means of a pin 6, the impeller being provided with suitable impeller blades 7. The hub 5 of the impeller receives the shaft 4 and has counterbore 8 extending inwardly from the outer face thereof which forms a chamber to receive a sealing ring to prevent leakage of liquid through the shaft opening of the housing. A washer 9 is slidably mounted on shaft 4 within the outer portion of the counterbore 8 and has radially projecting lugs 10 that engage in axially extending slots 11 in the outer end of the hub 5. The sealing ring of the present invention is adapted to be mounted within the counterbore 8 inwardly of the washer 9 in engagement with the inner face of the washer 9 and the exterior surface of the shaft 4 to prevent leakage of liquid from the pump housing through the bearing portion 3 of the housing.

The sealing portion of the sealing ring is a rubber ring 12 which has an outer end face 13 which bears against the inner face of the washer 9. Inwardly of the engaging face 13, the ring 12 has an enlarged portion 14, and inwardly of the enlarged portion 14 the ring 12 has a relatively thin, axially extending tubular flange 15 which is adapted to engage the peripheral surface of the shaft 4. The ring 12 is formed of an elastic rubber composition and the tubular portion 15 is normally of an internal diameter less than the diameter of the shaft 4, so that the said tubular portion 15 may be expanded and held tightly against the shaft by circumferential tension. The ring 12 has a shoulder 16 between the enlarged portion 14 and the inwardly extending tubular flange 15 of smaller diameter and is enclosed within a tubular inextensible shell 17 which may be formed of sheet metal. The shell 17 has a short inturned flange 18 at its outer end which overlies the shoulder of the outer edge of the enlarged portion 14, a shoulder portion 19 that engages the shoulder 16 of ring 12, a tubular portion 20 that surrounds the flange 15 and inwardly projecting flange 21 at its inner end which overlies the inner end of the tubular flange 15. The tubular portion 20 of the shell is spaced radially outwardly from the outer surface of the tubular flange 15 of the rubber ring and a cushioning band 22 of rubber is interposed between the tubular flange 15 and tubular portion 20 of the shell. The cushioning band 22 has its inner edge in engagement with the flange 21 and its outer edge spaced inwardly from the shoulder 16 of the ring 12 so as to provide a space for axial expansion of the band 22.

The ring 12 is preferably formed of a composition that is wear-resistant and oil-resistant and the cushioning band 22 which need not be wear resistant or oil resistant may be advantageously formed of a rubber that is softer than the rubber ring 12.

When the shaft engaging tubular portion 15 of the ring 12 is expanded and engaged with the exterior surface of the shaft 4, the cushioning band 22 is put under radial compression and maintains a radial thrust upon the shaft engaging portion 15 that is tensioned around the shaft. The swelling of the cushioning band 22 while in service by the action of oil thereon has the effect of increasing the radial pressure exerted upon the shaft engaging portion of the ring and does not impair the sealing action of the ring.

A coil spring 23 is disposed between the inner end of the counterbore 8 and the shoulder 19 of the shell 17 to press the sealing ring outwardly against the washer 9 which rotates with the shaft 4 and engages the flat inner face of the bearing portion 3 of the housing. The washer is preferably formed of graphite or of a composition containing graphite such as a hard rubber and graphite composition. The spring 23 holds the flat face 13 of the ring 12 against the disk 9 with sufficient pressure to maintain an effective seal between the ring 12 and the face of the disk 9. At the same time the portion 15 of the ring 12 is pressed tightly against the exterior surface of the shaft 4 to prevent leakage of liquid along the surface of the shaft to the bearing 3.

Figure 3:
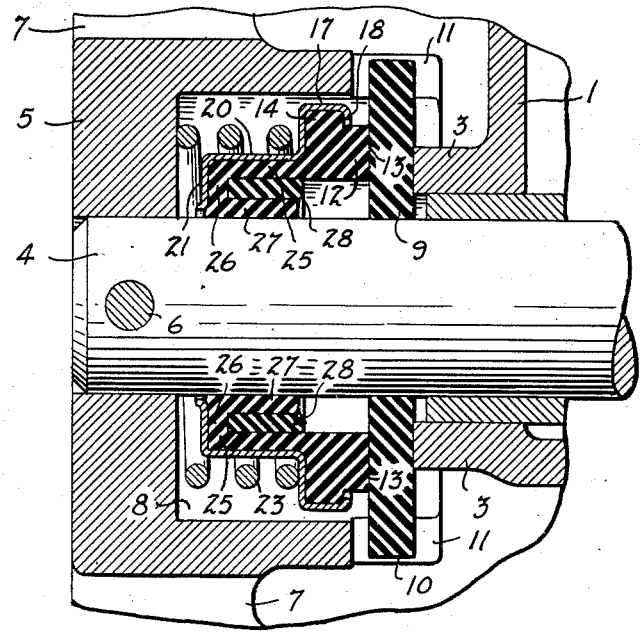
Fig. 3 is an axial section through a sealing ring of a slightly modified construction.

In Fig. 3 of the drawing a sealing ring of slightly different construction is shown. This ring is shown applied to a pump identical to that shown in Fig. 1, and identical elements are indicated by the same reference numbers in Figs. 1 and 3. The ring in Fig. 3 differs from that shown in Fig. 1 only in the shaft engaging portion thereof. As shown in Fig. 3, the rubber ring 12 has an inwardly extending flange comprising an outer portion 25 that bears against the interior of tubular portion 20 of the shell, an inwardly extending portion 26 that bears against the inner face of the flange 21 of the shell and an inner tubular expansible shaft engaging portion 27 that is concentric with the portion 25 and spaced inwardly therefrom to provide an outwardly facing axially extending channel in which a cushioning band 28 is mounted, the cushioning band being composed of a softer rubber than the ring 12 and having its outer edge free to expand when the band is subjected to compression.

It will be apparent that the present invention provides a sealing ring of simple and inexpensive construction which is adapted to be held in effective radial and axial pressures against the surfaces to be sealed and in which the advantages of a soft rubber seal are obtained without adversely affecting the durability of the sealing ring.

It is to be understood that variations and modifications of the specific device herein shown and described for purposes of illustration, may be made without departing from the spirit of the invention.

What I claim is:

1. A sealing ring comprising a tubular shell having end portions of different diameters, an elastic rubber ring having an end portion fitting within the large end of said shell and projecting axially past said end of the shell and an opposite end portion of less radial thickness and less internal diameter forming an expansible shaft engaging band within the smaller portion of the shell, and a radially compressible cushioning band between said expansible portion of said ring and the shell, said cushioning band being composed of a rubber softer than the rubber of said ring.

2. A sealing ring comprising a ring of elastic rubber having a relatively thin expansible tubular end portion for engagement with the periphery of a cylindrical member and an end portion of greater internal diameter and greater radial thickness provided with an annular end face for sealing engagement with a surface disposed transversely to the axis of the ring, a retaining shell having a tubular portion around the expansible tubular portion of the rubber ring and spaced radially outwardly from said tubular portion and a portion engaging the periphery of the large end of the rubber ring and terminating inwardly of said end face, said tubular portion of the shell having an inwardly projecting end flange that overlies the small end of said rubber ring and being spaced radially outwardly of said tubular portion of the ring, and a cushion of rubber softer than the rubber of said ring interposed between said tubular portions of the shell and ring.

3. A sealing ring comprising a tubular retaining shell having an inwardly projecting flange at one end, a ring of elastic rubber within the shell engaging said flange and projecting past the opposite end of the shell, said ring having an outer portion fitting the interior of the shell and an inner concentric expansible portion spaced radially inwardly from said outer portion to provide an annular axially extending channel, and a cushioning body of elastic rubber softer than that of the ring in said channel.

HOWARD M. DODGE.